(12) United States Patent
Hildebrand et al.

(10) Patent No.: US 11,572,779 B2
(45) Date of Patent: Feb. 7, 2023

(54) WELL CONSTRUCTION MANAGEMENT AND DECISION SUPPORT SYSTEM

(71) Applicant: Schlumberger Technology Corporation, Sugar Land, TX (US)

(72) Inventors: Ginger Vinyard Hildebrand, Houston, TX (US); Chunling Gu Coffman, Houston, TX (US); Rustam Isangulov, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/176,036

(22) Filed: Feb. 15, 2021

(65) Prior Publication Data

US 2021/0324727 A1    Oct. 21, 2021

Related U.S. Application Data

(63) Continuation of application No. 14/651,226, filed as application No. PCT/US2013/076978 on Dec. 20, 2013, now Pat. No. 10,920,565.

(Continued)

(51) Int. Cl.
*E21B 44/06* (2006.01)
*E21B 7/00* (2006.01)
(Continued)

(52) U.S. Cl.
CPC ................ *E21B 44/06* (2013.01); *E21B 7/00* (2013.01); *E21B 44/00* (2013.01); *E21B 44/04* (2013.01);

(Continued)

(58) Field of Classification Search
None
See application file for complete search history.

(56) References Cited

U.S. PATENT DOCUMENTS 2,153,549 A    4/1939    Cooper
2,159,233 A    5/1939    Stannard
(Continued)

FOREIGN PATENT DOCUMENTS

DE         3626574 B      2/1988
WO     2004090285 A1    10/2004
(Continued)

OTHER PUBLICATIONS

Examination Report 94(3) EPC issued in European Application 13864410.9 dated Aug. 24, 2016. (5 Pages).
(Continued)

*Primary Examiner* — Brent A. Fairbanks
(74) *Attorney, Agent, or Firm* — Alec J. McGinn

(57) ABSTRACT

A method for wellbore construction management includes measuring at least one drilling operating parameter during drilling of a wellbore. At least one well state parameter is calculated from the measured drilling operating parameter. A difference between the calculated well state parameter and a predetermined value of the well state parameter is determined. When the difference exceeds a selected threshold a modified well plan is calculated comprising at least one drilling task to enable construction of at least part of the wellbore to conform to the modified well plan. The at least one drilling task is displayed to a user.

21 Claims, 12 Drawing Sheets

Related U.S. Application Data

(60) Provisional application No. 61/740,219, filed on Dec. 20, 2012.

(51) Int. Cl.
    *E21B 44/04*     (2006.01)
    *G05B 19/05*     (2006.01)
    *E21B 44/00*     (2006.01)

(52) U.S. Cl.
    CPC .... *G05B 19/05* (2013.01); *G05B 2219/13018* (2013.01)

(56) References Cited

U.S. PATENT DOCUMENTS

| | | | |
|---|---|---|---|
| 2,264,744 | A | 12/1941 | Dunnam |
| 2,555,073 | A | 5/1951 | Zdankoski |
| 2,596,403 | A | 5/1952 | Hoffman |
| 3,389,489 | A | 6/1968 | Burns |
| 3,543,432 | A | 12/1970 | Gates |
| 3,555,719 | A | 1/1971 | Butler |
| 4,014,128 | A | 3/1977 | Hrdlicka |
| 4,841,660 | A | 6/1989 | James |
| 4,890,414 | A | 1/1990 | Bridenthal et al. |
| 5,054,228 | A | 10/1991 | Elkins |
| 5,054,669 | A | 10/1991 | Zimbardi et al. |
| 5,092,263 | A | 3/1992 | Hutchison et al. |
| 5,209,009 | A | 5/1993 | Fast |
| 5,471,779 | A | 12/1995 | Downey |
| 5,636,469 | A | 6/1997 | Pizzolo et al. |
| 5,901,795 | A * | 5/1999 | Tsao ............ E21B 43/30 |
| | | | 175/45 |
| 5,938,023 | A | 8/1999 | Herron et al. |
| 6,370,810 | B1 | 4/2002 | Widerman |
| 6,736,221 | B2 * | 5/2004 | Chia ............ E21B 47/022 |
| | | | 175/45 |
| 6,742,789 | B1 | 6/2004 | Nowak |
| 6,892,812 | B2 | 5/2005 | Niedermayr et al. |
| 6,904,981 | B2 | 6/2005 | Van Riet |
| 10,920,565 | B2 | 2/2021 | Hildebrand et al. |
| 2002/0023381 | A1 | 2/2002 | Chambeyron |
| 2003/0015351 | A1 | 1/2003 | Goldman et al. |
| 2003/0121657 | A1 * | 7/2003 | Chia ............ E21B 47/022 |
| | | | 175/45 |
| 2003/0220742 | A1 | 11/2003 | Niedermayr et al. |
| 2004/0153245 | A1 * | 8/2004 | Womer ............ E21B 44/00 |
| | | | 702/9 |
| 2008/0126168 | A1 | 5/2008 | Carney et al. |
| 2008/0236270 | A1 * | 10/2008 | Denichou ............ G01V 11/00 |
| | | | 73/152.16 |
| 2008/0289877 | A1 * | 11/2008 | Nikolakis-Mouchas ............ |
| | | | E21B 44/00 |
| | | | 175/57 |
| 2009/0090555 | A1 * | 4/2009 | Boone ............ E21B 44/02 |
| | | | 175/45 |
| 2009/0120690 | A1 * | 5/2009 | Phillips ............ E21B 44/00 |
| | | | 175/45 |
| 2010/0271232 | A1 * | 10/2010 | Clark ............ E21B 47/0228 |
| | | | 340/853.2 |
| 2010/0307742 | A1 * | 12/2010 | Phillips ............ E21B 47/04 |
| | | | 166/250.01 |
| 2012/0123756 | A1 * | 5/2012 | Wang ............ E21B 44/00 |
| | | | 703/2 |
| 2012/0158761 | A1 * | 6/2012 | Aamodt ............ G16Z 99/00 |
| | | | 707/758 |
| 2012/0217067 | A1 * | 8/2012 | Mebane, III ............ E21B 44/02 |
| | | | 175/57 |
| 2015/0226049 | A1 * | 8/2015 | Frangos ............ E21B 49/00 |
| | | | 702/6 |

FOREIGN PATENT DOCUMENTS

| | | |
|---|---|---|
| WO | 2005093212 A1 | 10/2005 |
| WO | 2012106347 A1 | 8/2012 |
| WO | 2014099310 A1 | 6/2014 |

OTHER PUBLICATIONS

Search Report Under R.61 or R.63 EPC issued in European Application 13864410.9 dated August 9, 2016. (3 Pages).
International Search Report and Written Opinion issued in PCT/US2013/076978 dated Apr. 17, 2014. (18 Pages).
International Preliminary Report on Patentability issued in PCT/US2013/076978 dated Jul. 2, 2015. (15 Pages).
Search Report and Examination Report for the counterpart UAE patent Application 821/2015 dated Oct. 29, 2019 (13 pages).
Examination Report for the counterpart Canadian patent Application 2894507 dated Nov. 25, 2019 (5 pages).
Extended European Search Report dated Dec. 21, 2020 in equivalent European Patent Application No. 19204448.5 (14 Pages).
CA—Exam Report for the equivalent CA Patent Application 2894507 dated Jun. 22, 2020 (5 pages).
CA—Exam Report for the equivalent CA Patent Application 2894507 dated Feb. 25, 2021 (7 pages).
AE—2nd Exam Report for equivalent AE Patent Application 821/2015 dated Jun. 16, 2021 (10 pages).

* cited by examiner

WELL CONSTRUCTION MANAGEMENT AND DECISION SUPPORT SYSTEM

RELATED APPLICATIONS

This application is a continuation of U.S. patent application Ser. No. 14/651,226, which has a § 371(c) date of 11 Jun. 2015 and is a national stage application filed under 35 U.S.C. § 371 of the International Patent Application No. PCT/US2013076978 filed on 20 Dec. 2013, which claims the benefit of U.S. provisional patent application No. 61/740,219 filed on 20 Dec. 2012, each of which is incorporated by reference herein in its entirety.

STATEMENT REGARDING FEDERALLY SPONSORED RESEARCH OR DEVELOPMENT

Not applicable.

BACKGROUND

This disclosure relates generally to the field of wellbore construction. More specifically, the disclosure relates to systems for monitoring operations during wellbore construction and providing information to selected personnel to support decisions for operating drilling equipment so that a wellbore may be drilled and completed in a safe, consistent and cost effective manner.

Drilling unit operators ("drillers") must monitor and analyze a wide breadth of information to make critical well construction decisions. This is difficult for even highly skilled and experienced drillers, and not all drillers have sufficient skills and/or experience to consistently make optimal drilling decisions. Oil company representatives stationed at the drilling unit site and offsite well construction engineers have few decision support tools to help them leverage real-time and historical data in order to manage the performance of the well construction operation. Further, drillers may encounter specific situations during drilling that the particular oil company has predetermined policies and procedures for disposition thereof. Other situations that a driller may encounter may have already been encountered during the construction of other wellbores through corresponding or similar subsurface formations, and having knowledge of how such situations were disposed at the other wellbores may be valuable to the driller presently encountering such situation.

The well construction engineer may also be able to provide guidance to the driller in disposition of certain drilling situations. Similarly, service personnel frequently working at a wellbore construction site, such as directional drillers, mud loggers, and measurement while drilling/logging while drilling engineers have access to information about the trajectory of the well and the formations being drilled which may assist the driller in more efficiently constructing a well.

What is needed is a system to give all drilling personnel well construction instructions on how to properly and safely conduct well construction operations based on the available information from a plurality of sources and to coordinate the decisions and actions of all personnel. This includes how to correct inefficiencies and/or errors in the drilling operation. A system is also needed to enable a well construction engineer or similar off site personnel to remotely monitor wellbores as they are being drilled so that inefficiencies and/or errors can be separately identified and instructions communicated to the driller to assist in correction thereof.

SUMMARY

A method according to one aspect for wellbore construction management includes measuring at least one drilling operating parameter during drilling of a wellbore. At least one well state parameter is calculated from the measured drilling operating parameter. A difference between the calculated well state parameter and a predetermined value of the well state parameter is determined. When the difference exceeds a selected threshold a modified well plan is calculated comprising at least one task to enable construction of at least part of the wellbore to conform to the modified well plan. The at least one task is displayed to a user.

Other aspects and advantages will be apparent from the description and claims which follow.

DETAILED DESCRIPTION

Figure 1:
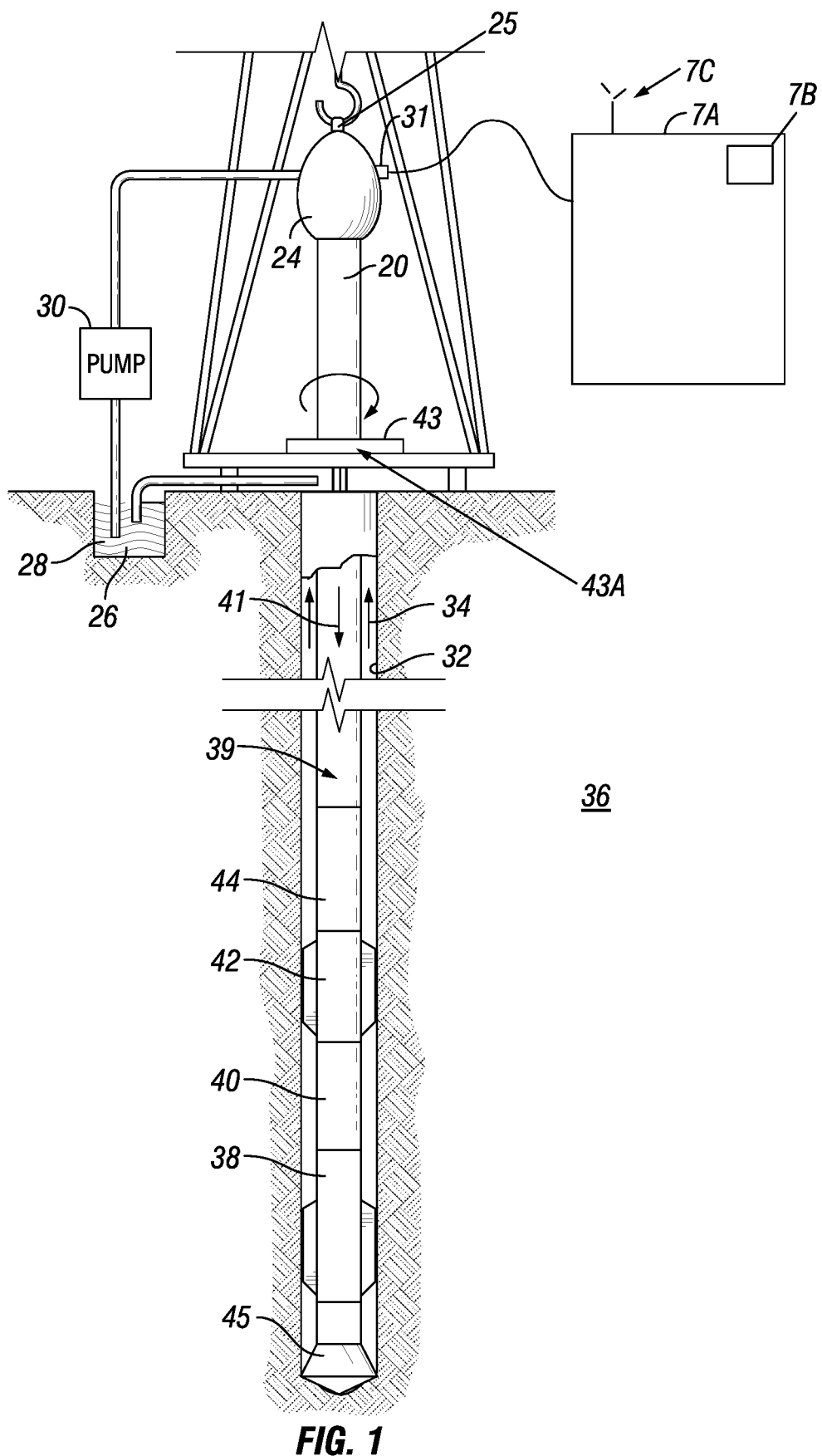
FIG. 1 shows an example well site drilling system as it is used to drill a wellbore through subsurface formations.

FIG. 1 shows an example drilling system configuration for acquiring well data that may use, among other sensing devices, a logging while drilling (LWD) system 39. The LWD system 39 may include one or more collar sections 44, 42, 40, 38 coupled to the lower end of a drill pipe 20. The LWD system 39 may form part of a bottom hole assembly (BHA) coupled to the drill pipe 20 and includes at a lower end thereof a drill bit 45 to drill the wellbore 32 through the earth's subsurface 36. Drilling is performed by rotating the drill pipe 20 by means of a rotary table 43, or in other examples by a top drive (not shown in FIG. 1). In still other implementations a drilling motor (not shown) may be used to rotate some or all of the drill pipe 20. The manner of rotating the drill pipe 20 is not a limit on the scope of the present disclosure. During rotation, the drill pipe 20 is suspended by equipment on a drilling unit (drilling rig) 10 including a swivel 24 which enables the pipe 20 to rotate while maintaining a fluid tight seal between the interior and exterior of the pipe 20. Mud pumps 30 draw drilling fluid ("mud") 26 from a tank or pit 28 and pump the mud 26 through the interior of the pipe 20, down through the LWD system 39, as indicated by arrow 41. The mud 26 passes through orifices (not shown) in the bit 45 to lubricate and cool the bit 45, and to lift drill cuttings in through an annulus 34 between the pipe 20, LWD system 39 and the wellbore 32. The cuttings may be collected and analyzed by separate equipment operated by a "mud logger." Any fluid content in the returned drilling mud, such as gas and/or oil may also be analyzed by the mud logger equipment or other devices, such as an automatic gas chromatograph. The mud logger, as will be explained below with reference to FIG. 3, may provide information related to analysis of cuttings and the returned mud by manual or automatic entry into a computer system (FIG. 2) that analyzes data input thereto.

The collar sections 44, 42, 40, 38 may include sensors (not shown) therein which make measurements of various properties of the subsurface earth formations 36 through which the wellbore 32 is drilled. These measurements are typically recorded in a recording device (not shown) disposed in one or more of the collar sections 44, 42, 40, 38. LWD systems known in the art typically include one or more "measurement while drilling" (MWD) sensors (not shown separately) which measure selected drilling parameters, such as inclination and azimuthal trajectory of the wellbore 32. Other drilling sensors known in the art may include axial force (weight) applied to the LWD system 39, and shock and vibration sensors.

The LWD system 39 may include a mud pressure modulator (not shown separately) in one of the collar sections 44. The mud pressure modulator (not shown) applies a telemetry signal to the flow of mud 26 inside the LWD system 39 and drill pipe 20 where it is detected by a pressure sensor 31 disposed in the mud flow system. The pressure sensor 31 is coupled to detection equipment (not shown) in a surface recording system 7A which enables recovery and recording of information transmitted in the telemetry scheme sent by the LWD system 39. The telemetry scheme may include a subset of measurements made by the various sensors (not shown separately) in the LWD system 39. The remainder of the measurements made by the sensors (not shown) in the system may be transferred, for example, using radio telemetry or a cable connection, to the surface recording system 7A when the LWD system 39 is withdrawn from the wellbore 32.

The LWD data acquisition system and method shown in FIG. 1 is only meant to serve as an example of how data are acquired at the well site, and is not in any way intended to limit the scope of the disclosure. Other sources of data may include control systems for wellbore pressure control. See, for example, U.S. Pat. No. 6,904,981 issued to van Riet. The system described in the van Riet '981 patent can provide automatic control over wellbore fluid pressure, and may also calculate parameters such as expected formation fluid pressure and expected formation fracture pressure. Such data may also be communicated as will be further explained below. Still other sources of data may include, without limitation, so-called "mudlogging" data as explained above, wherein drilling fluid returned from the wellbore is analyzed for the presence of materials such as hydrocarbons, and samples of drill cuttings are analyzed for mineral content and grain structure. Still other data may include casing programs (i.e., depth to which casings are set and respective diameters thereof and types of cement to be used) and planned wellbore geodetic trajectory. Any one or more of the foregoing data types, whether measured during drilling of the wellbore, entered into a computer system (explained below) manually or otherwise, may be referred to as a "wellbore construction parameter." The drilling rig operator (driller) may operate the drilling unit, typically by manual input to a control panel of a programmable logic controller (PLC—not shown in FIG. 1) that operates various devices on the drilling rig such as the rate at which the pump 30 discharges drilling fluid, the rate at which the swivel 24 (or top drive) is lowered into the wellbore, thus affecting the axial force (weight) on the drill bit 45, which may be inferred by a load cell 25 that measures the axial loading on the drill pipe 20, and the rotating speed of the drill bit 45. The foregoing parameters, which are controllable by the drilling unit operator, may be referred to as "drilling operating parameters." Another sensor that may be used in some examples is a torque sensor 43A that may be coupled to the rotary table 43 if used, or may be included in the top drive (if used; not shown in FIG. 1).

In FIG. 1 both the surface recording systems 7, and 7A, respectively, may include a data communication subsystem 7B coupled to a suitable antenna, satellite dish or other communication link 7C. Such data communication subsystem 7B may be of any type known in the art suitable for use at the particular location of the welllsite, for example, satellite communication to the Internet, or a dedicated satellite based communication link. Radio communication, wired communication or any other form of data communication is within the scope of the communication subsystem 7B applicable to the present example method and system and the foregoing examples should not be considered limiting. Communication may take place over any form of data network.

For purposes of the present disclosure, the drilling system shown in FIG. 1 may be only one of a plurality of drilling systems that may be monitored by a well construction engineer or drilling engineer (FIG. 3) from any location and using any device that can access a computer system as will be explained with reference to FIG. 2. Such access devices may be directly connected to the computer system, or may be remotely accessible, such as by wireless broadband systems using Internet-capable communication (e.g., tablets or smart phones), dedicated-channel wireless or radio communication terminals, or telephone network connected terminals (e.g., DSL Internet access). Monitoring and advising operations on a plurality of well construction projects will be further explained below.

Figure 2:
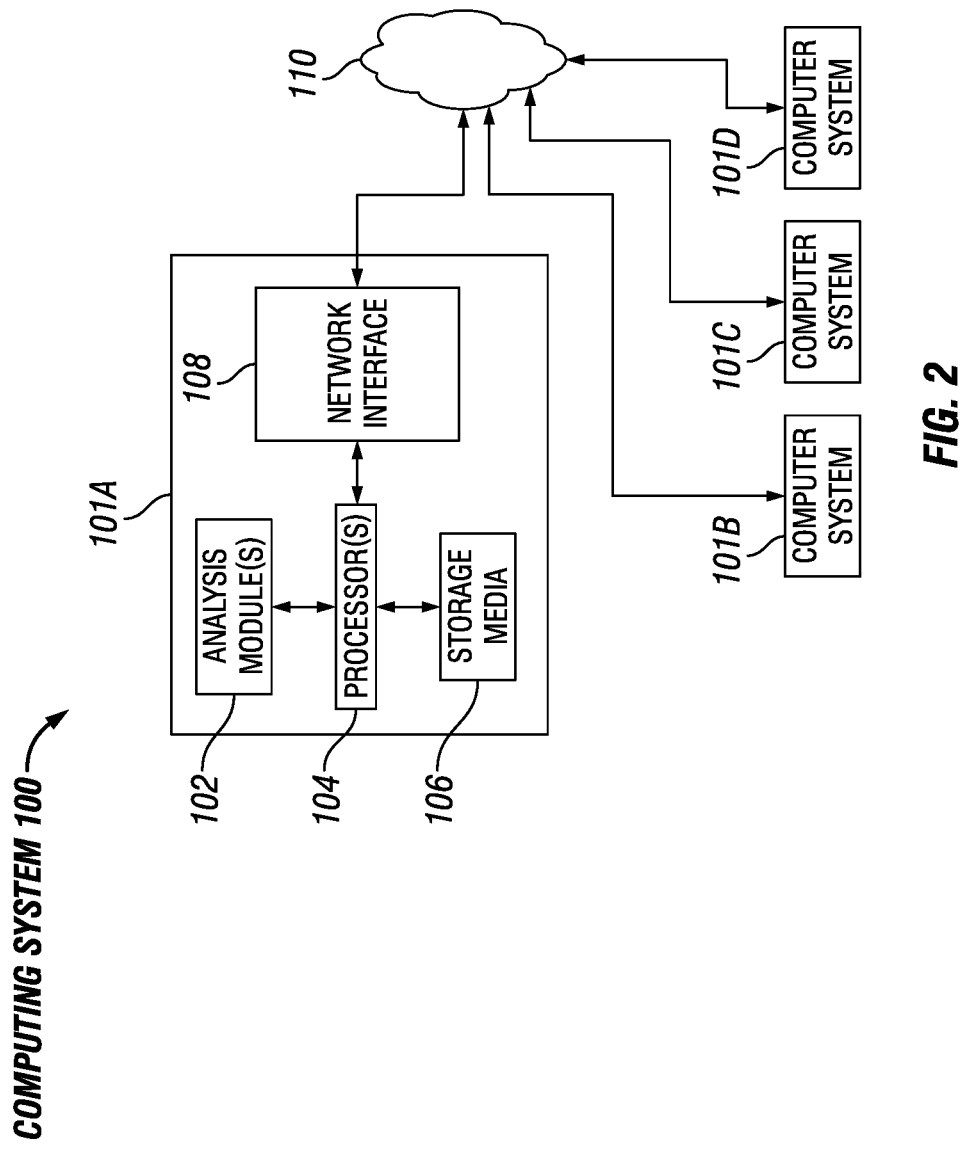
FIG. 2 shows an example computer system that may be used in some embodiments.

FIG. 2 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks to be explained further below. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be on a ship underway on the ocean or on a well drilling location, while in communication with one or more computer systems such as 101C and/or 101D that may be located in one or more data centers on shore, aboard ships, and/or located in varying countries on different continents). The processor(s) 104 may be in signal communication with a display/input device 107, which may be, for example, and without limitation, a touch screen, LCD or LED display and keyboard or any other form of device for displaying information transferred through or generated in the processor 104 to one or more human operators. Each of the additional computer systems 101B, 101C, 101D may have associated therewith a display and user input device 101BB, 101CC, 101D, respectively, as explained with reference to computer system 101A.

A processor for purposes of the present disclosure can include a microprocessor, microcontroller, processor module or subsystem, programmable integrated circuit, programmable gate array, or another control or computing device.

The storage media 106 can be implemented as one or more computer-readable or machine-readable storage media. Note that while in the exemplary embodiment of FIG. 2 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 2, and/or computing system 100 may have a different configuration or arrangement of the components depicted in FIG. 2. The various components shown in FIG. 2 may be implemented in hardware, software, or a combination of both hardware and software, including one or more signal processing and/or application specific integrated circuits.

Further, the elements in the processing methods described below may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Figure 3:
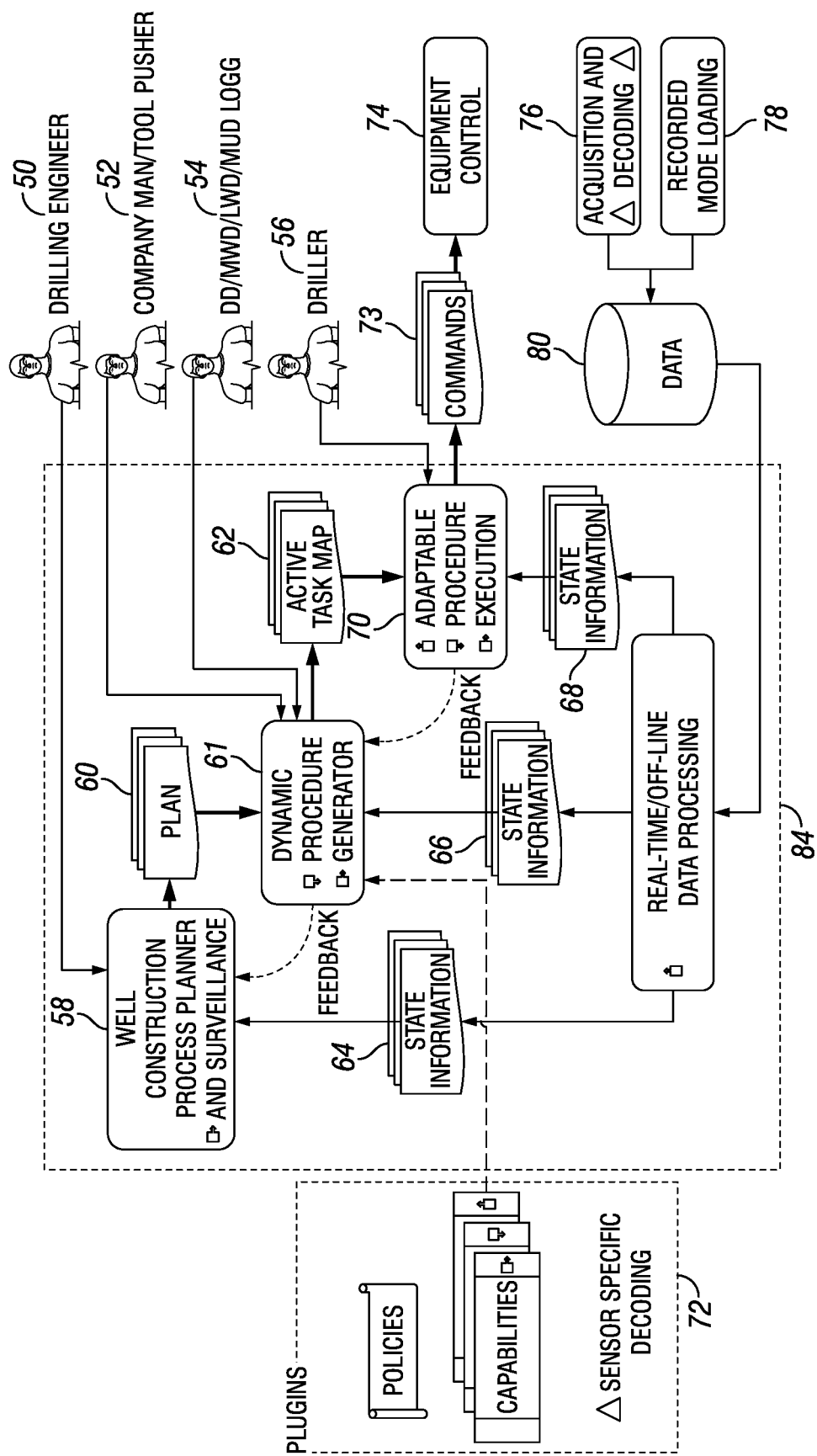
FIG. 3 shows an example process implemented on an individual well being planned and drilled.

FIG. 3 shows an example implementation of a well construction decision support and control system. The system shown in FIG. 3 may be implemented in the recording system (7A in FIG. 1) and/or in any other computer or computer system as explained with reference to FIG. 2. Data from wellbore drilling, including the selected drilling operating parameters defined above and "drilling response parameters" (e.g., and without limitation) rate of axial elongation of the wellbore, torque applied to the drill pipe and pressure of the drilling fluid both as it is pumped in and as it is returned to the surface, well tortuosity, detected wellbore fluid influx or loss, drill bit wear rate and drilling motor performance, may be acquired as measured (acquisition and loading) as shown at 76 and/or recorded in the various components of the MWD/LWD instrument string (FIG. 1) shown as "recorded mode loading" at 78. Such data may be transferred to the computer, computer system or data processor (e.g., 101A in FIG. 2) for calculating parameters relevant to construction (e.g., drilling) of the wellbore. The data may also be stored in any form of data storage device at 80. Such calculated parameters may include, without limitation, wellbore geodetic trajectory, formation characteristics, fluid pressures, rate of penetration of the drill bit (i.e., rate of axial elongation of the wellbore), and characteristics of mechanical interaction between drilling and measurement equipment in the wellbore and the wellbore (FIG. 1) through the formations as the wellbore is drilled. The measurements used to generate the foregoing calculated parameters, as well as the measurements themselves, may be communicated to the computer system as shown in FIG. 2 as well as a computer or processor located at the well site, e.g., as shown at 84 in FIG. 3. Collectively, the measurements and any such computed parameters may be referred to as the "state" of the wellbore ("well state") at any point in time. The well state may be communicated (e.g., using the communication system 7B, 7C in FIG. 1) at 64, to the well construction engineer or drilling engineer 50. The well construction engineer 50 may access the computer system ("surveillance" in FIG. 3) by any means as explained above to evaluate the well state at any time, as shown at 58 in FIG. 3. The well state may also be communicated to a wellbore operator representative 52 and the drilling unit operator (driller) 56 in a suitable format to enable the respective personnel to take action or to allow automatic operation of the drilling unit in response to the calculated well state.

Initially, a wellbore under construction such as shown in FIG. 1 may have, for example and without limitation, a pre-planned trajectory, predefined set of pipes or casings and depths to which they are to be set, drill bits to be used, and densities of drilling fluid to be used in the wellbore construction, called the "well plan" 60 in FIG. 3. The computer system (FIG. 2) may generate a set of procedures called an "active task map", at 61 ("dynamic procedure generator") and 62 ("active task map"), to cause the well to be constructed according to the well plan 60. The set of procedures may include drilling operating parameters to be used at any point along the well being drilled. In addition, the particular wellbore operator may have its own particular set of policies and procedures, shown at 72, which limit the scope of actions or procedures that may be used in the execution of the well plan 60, and as will be further explained, provide limits and/or guidance on response to incidents during drilling that exceed the scope of expected conditions. The range of procedures may also be limited by the physical limitations of the drilling equipment (also shown at 72). The well plan 60 may be communicated to a computer terminal or display or be otherwise remotely accessible by a wellbore operator representative ("company man") shown at 52 and/or a drilling contractor supervisor ("tool pusher") shown at 52 located at the well site. Such access may be in any form as described with reference to the computer system in FIG. 2.

As a result of the well plan 60 and computed procedures generated by the dynamic procedure generator 61, it is possible to calculate a set of well states corresponding to each depth in the wellbore that may be expected to exist during its construction. Such well states may be referred to individually, e.g., by depth, as a "predetermined well state." During drilling of the wellbore, the calculated well state and/or the computed procedures, as explained above and shown at 62 and 64, may be communicated to persons with requisite authority such as the company man and/or toolpusher 52 as drilling of the wellbore proceeds. The foregoing individuals may reject, approve, replace or modify the procedure changes calculated by the computer system with such action recorded in the computer system (or other data storage, e.g, at 80 in FIG. 3) and may be communicated to other parts of the computer system and corresponding personnel. The authority of various personnel to change, approve, reject or modify the active task map may be preprogrammed into the computer system. In similar way, a potentially different description of well state and/or procedures may be communicated to selected individuals responsible for performing tasks related to any part or all of the well construction plan, e.g., the drilling engineer 50.

In some circumstances the calculated well state may differ from the predetermined well state such that the computer system 84 may calculate that completion of construction of the wellbore according to the initial well plan is impracticable or cannot be performed without exceeding the scope of the policies set by the wellbore operator or the physical limitations of the drilling equipment (e.g., at 72) or is likely to incur a risk of an adverse condition like stuck pipe, wellbore collision, circulation loss, etc. Such circumstances may cause an update to the well plan 60, generated automatically by the computer system 84 and approved, updated, rejected or replaced by a person with requisite authority such as the well construction engineer 50, and such update(s) may be communicated to other parts of the system and corresponding personnel in a manner as described above. Additionally, a person with requisite authority such as the well construction engineer 50, may update the well plan manually based on the calculated well state, for example this may be done to place the well in the formation more accurately than the plan did. The authority of various personnel to change, accept, reject or modify the well plan may be preprogrammed into the computer system. In the present example, changes in the well plan 60 necessitated by differences between the planned well state 64 and the actual well state, e.g., as computed at 66 may cause the computer system 84 to calculate one or more possible procedures (i.e., in the dynamic procedure generator 61) and tasks associated with such procedures, shown at 62 as an "active task map" to be displayed to the personnel responsible for execution of the specific procedures or subsets of the specific procedures.

Specific drilling procedures or operating parameters to be used during drilling of the wellbore at any time may be communicated to the drilling unit operator ("driller") 56, shown as "adaptable procedure execution" 70 in FIG. 3, using the computer system at 84, or as explained with reference to FIG. 2. The driller 56 may access the computer system 84 in any manner as explained with reference to FIG. 2. The driller 56 may then use the communicated drilling operating parameters to operate the drilling rig (FIG. 1) in a manner consistent with the procedures communicated in the execution block 70 in FIG. 3. Such operation may include manual, automatic or other entry of control signals 73 to a programmable logic controller (PLC) 74 that may operate the drilling unit automatically in accordance with the entered parameters, such as at 74 in FIG. 3.

As the wellbore is being drilled, the well state, computed as explained above, may be communicated to the driller 56. In the event the computed well state at any time differs from the expected or predetermined well state at any point in the initially generated well plan, the dynamic procedure generator 61 may calculate corrective procedures, e.g., changes to one or more drilling operating parameters and/or tasks needed to complete drilling of the wellbore and communicate such procedures and tasks to the tool pusher, company man 52 and/or driller 56. The corrective procedures may be communicated as shown at 62 in FIG. 3. As shown in FIG. 3, the corrective procedures may be limited or governed by policies or best practices of the particular wellbore operating entity, which may be entered into the computer system upon generation of the initial well plan (e.g., at 72 in FIG. 3) or at any other time. Thus, the types of corrective procedures generated in the dynamic procedure generator 61 may be consistent with such predetermined policies. When communicated to the driller 56, the corrective actions may be implemented in the same manner as ordinary drilling controls or operational procedures, i.e., by manually, automatically or otherwise entering commands, at 73, into the PLC to operate the various components of the drilling unit, at 74. The computer system (FIG. 2) may record all operations and all user actions and may report compliance of such operations with the predetermined policies. Revised calculations of the well state 68 may be used to determine, at 70 whether the adjusted procedures, at 62 have fulfilled the purpose of correcting the actual well state to more closely correspond to the predetermined well state at any point in the well, or if further correction to the procedures (e.g., by dynamic procedure generator 61 is needed. As explained above, if the calculated well state is such that the dynamic procedure generator 61 cannot generate a corrective procedure to enable the well state to be returned to the predetermined well state at any depth, such information may be communicated to the well construction engineer 50 and a revised well plan 58 may be generated either automatically and/or manually input by the well construction engineer 50. The revised well plan 58 may be used to generate new values for drilling operating parameters (in the dynamic procedure generator 61) and/or drilling tasks. The revised well plan 60 will result in an expected or predetermined well state for the remaining portion of the well to be constructed. The foregoing comparison of the actual well state to the predetermined well state may continue in the same manner as described with reference to the initial well plan.

As the wellbore is being drilled, data may also be communicated to various service company personnel at the well site and/or at remote locations using the computer system (FIG. 2). Such personnel may include, without limitation a directional driller (person who operates directional drilling instruments to cause the wellbore to follow a preplanned geodetic trajectory), mudloggers, and MWD/LWD operating personnel, shown collectively at 54. Such data may include raw measurements from the various sensors on the drilling unit or disposed in the drill string (FIG. 1), a computed state of the well at 68, an active task map at 62 (which may be a set of drilling tasks or procedures to be performed as explained above), and drilling operating parameters at 73. The communicated data may indicate that a change in one or more tasks or drilling operating parameters is necessary. Possible changes in the drilling operating parameters may be calculated in the computer system and communicated to the company man, tool pusher and/or service company personnel as explained above in the dynamic procedure generator. The foregoing personnel may make decisions based on the calculated changes to the drilling operating parameters or active task maps; these decisions may be recorded in the computer system and communicated to the driller 56. The driller 56 may then change one or more of the drilling operating parameters either as calculated or as modified by any or all of the foregoing personnel described above to cause the well state to conform to the predetermined well state 60. Alternately, the computer system may be configured to automatically change one or more of the drilling operating parameters with or without driller involvement. As explained above, the corrective procedures may be constrained by the particular wellbore operator (oil company that is in charge of the wellbore construction) policies entered into the computer system at 72, or by the equipment capabilities.

During drilling the wellbore, the well state and the active task map 62 may also be communicated directly to the driller 56. The driller may adjust one or more the drilling operating parameters, as previously explained using adaptable procedure execution at 70, at any time to cause the wellbore to be drilled more closely to the predetermined well plan, or to cause the well state to more closely match a predetermined well state, to the extent the well state deviates from the predetermined well state or well states that are within selected operating limits. Non-limiting examples of well states that may be limited include an amount of "overpull" when the drill string is lifted from the bottom of the well, and amount of torque applied to the drill string, the well trajectory differing from a planned trajectory by a selected threshold amount and a pressure of the drilling fluid being pumped into the drill string.

In the present example, the drilling unit (10 in FIG. 1) may include automatic controls for implementing certain aspects of the drilling operations. For example, the rate of movement of the drill pipe into the wellbore, the rate of pumping and the rotation rate of the drill pipe from the surface may all be automatically controlled. The computer system may generate command signals according to the adaptable procedure execution 70. The commands may be entered into the equipment control 74, as explained above, such as a programmable logic controller (PLC) that causes the drilling unit to operate according to the selected or calculated drilling operating parameters.

While all of the foregoing activity is underway, the well construction (drilling) engineer 50, as explained above, may have remote access to the data used to calculate the well state, the active task map, the drilling operating parameters, the risks of adverse conditions and the calculated well state at any time. To the extent the actual well state deviates from any predetermined well state, the well construction engineer 50 may communicate instructions to the company man, the tool pusher, the driller (collectively 52) or any of the service company personnel (collectively 54) at the well site to change procedures and/or one or more drilling operating parameters to correct any deviations of the well state from the predetermined well state. The computer system may also automatically calculate adjustments to one or more drilling operating parameters to cause the calculated well state to more closely match a predetermined well state.

Automatic calculation of correction to one or more drilling operating parameters may be made using, for example and without limitation, stored data from other nearby wellbores (e.g., in data storage 80), empirically derived relationships between drilling operating parameters (which may also be stored, for example, in data storage 80) and drilling response parameters, and measurements of parameters used to calculate the well state.

Figure 4:
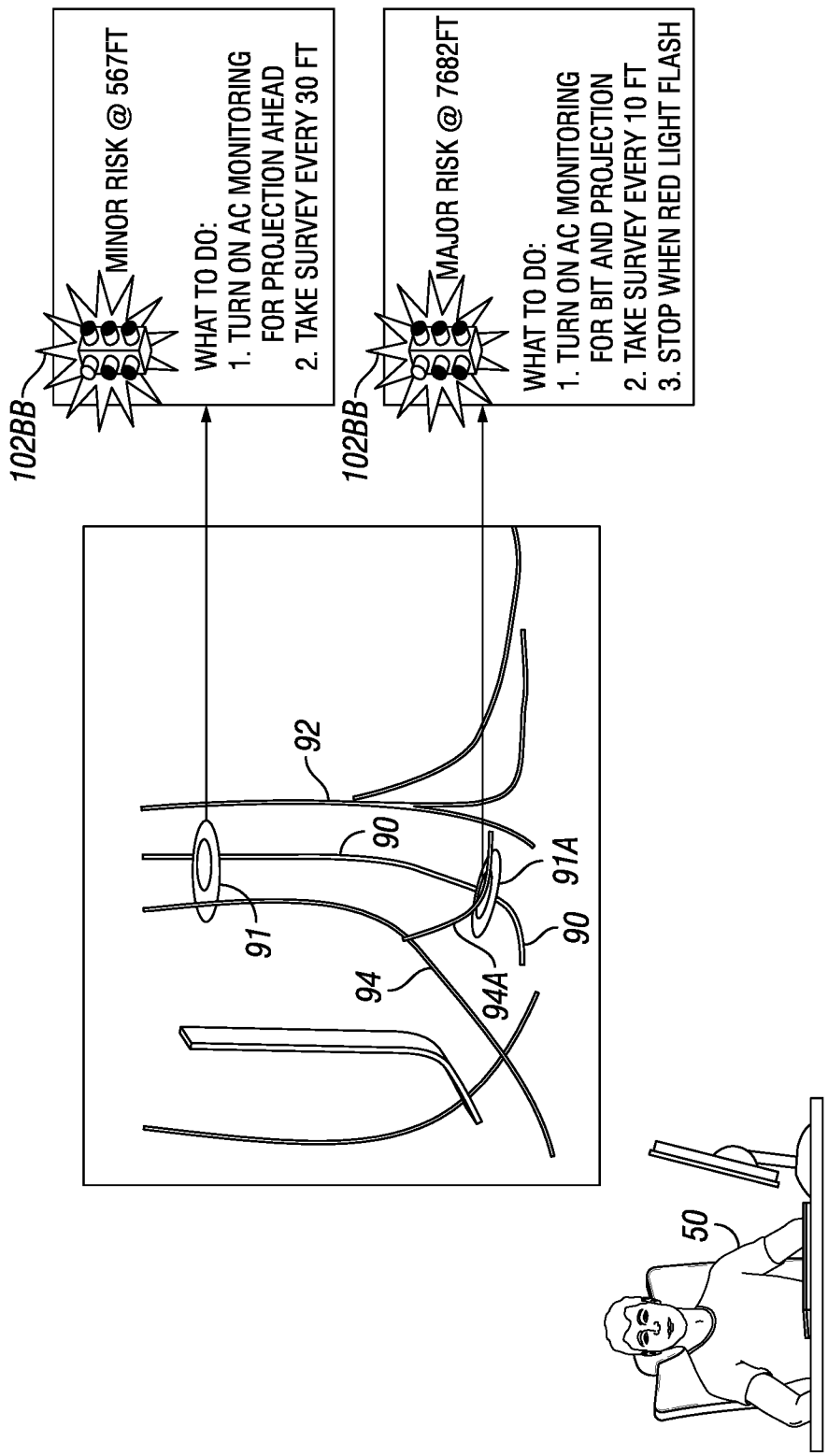
FIGS. 4 through 8 show an example of the example process used to implement wellbore anti-collision procedures.

FIGS. 4 through 8 show an example of the implementation of FIG. 3 as it may be used in wellbore anti-collision drilling control. In FIG. 4, the drilling or wellbore construction engineer 50 may design a wellbore trajectory 90 drilled from a surface (or water bottom) position that is close by those of other wellbores, e.g., 92 and 94. The wellbore being designed 90 may have a specific geodetic subsurface target position, shown at 90A, in a potentially hydrocarbon productive formation. Designing the wellbore trajectory may include limiting the trajectory to within certain limits related to the accuracy of the survey instruments (e.g., the MWD system of FIG. 1) in determining the geodetic position of the wellbore at any depth. The foregoing are shown as ellipses of uncertainty at 91 and 91A. Based on the foregoing limits, and the determined geodetic trajectories of proximate wellbores, a geodetic trajectory may be designed to minimize or otherwise accept defined risk of the wellbore 90 being drilled intersecting (colliding with) proximate wellbores, for example, at 94A and 92. The risk may be defined at any or all measured depths (axial positions) along the planned trajectory of the wellbore 90. The computer system (FIG. 2) may be programmed to accept as input a calculated risk of collision at each depth in the wellbore, evaluate the calculated risk with the policies (72 in FIG. 3) of the particular wellbore operator concerning the collision risk, and generate warning indicators, e.g., 102BB to be communicated to the computer system users at the well site, e.g., the company man, the tool pusher, the MWD engineer and the directional driller. The example warning indicators, in one non-limiting examples, may be color representations of the severity of the risk. In FIG. 4, an example moderate collision risk may exist at a position shown by an ellipse of uncertainty at 91. Based on the calculated level of risk, the well construction engineer 50 may communicate to the appropriate drilling unit site personnel (i.e., the company representative, drilling rig manager and driller) a procedure wherein axial rate of elongation of the wellbore is limited to a predetermined maximum value, and a directional survey should be obtained at a first selected depth interval, for example, every 30 feet (10 meters). In a second situation, shown at 91A, a risk of collision is calculated as severe. Instructions communicated from the wellbore construction engineer 50 to the drilling unit personnel may include further reducing the rate of axial elongation of the wellbore, and obtaining directional survey information at shorter intervals (e.g., every 10 feet or 3 meters). In the present example, the wellbore construction engineer may visually observe the well state and communicate changes in the operating procedures (manual override of the dynamic procedure generator in FIG. 3), or the computer system may perform the foregoing functions of risk analysis and communication of changes in operating procedures to the appropriate personnel automatically.

Figure 5:
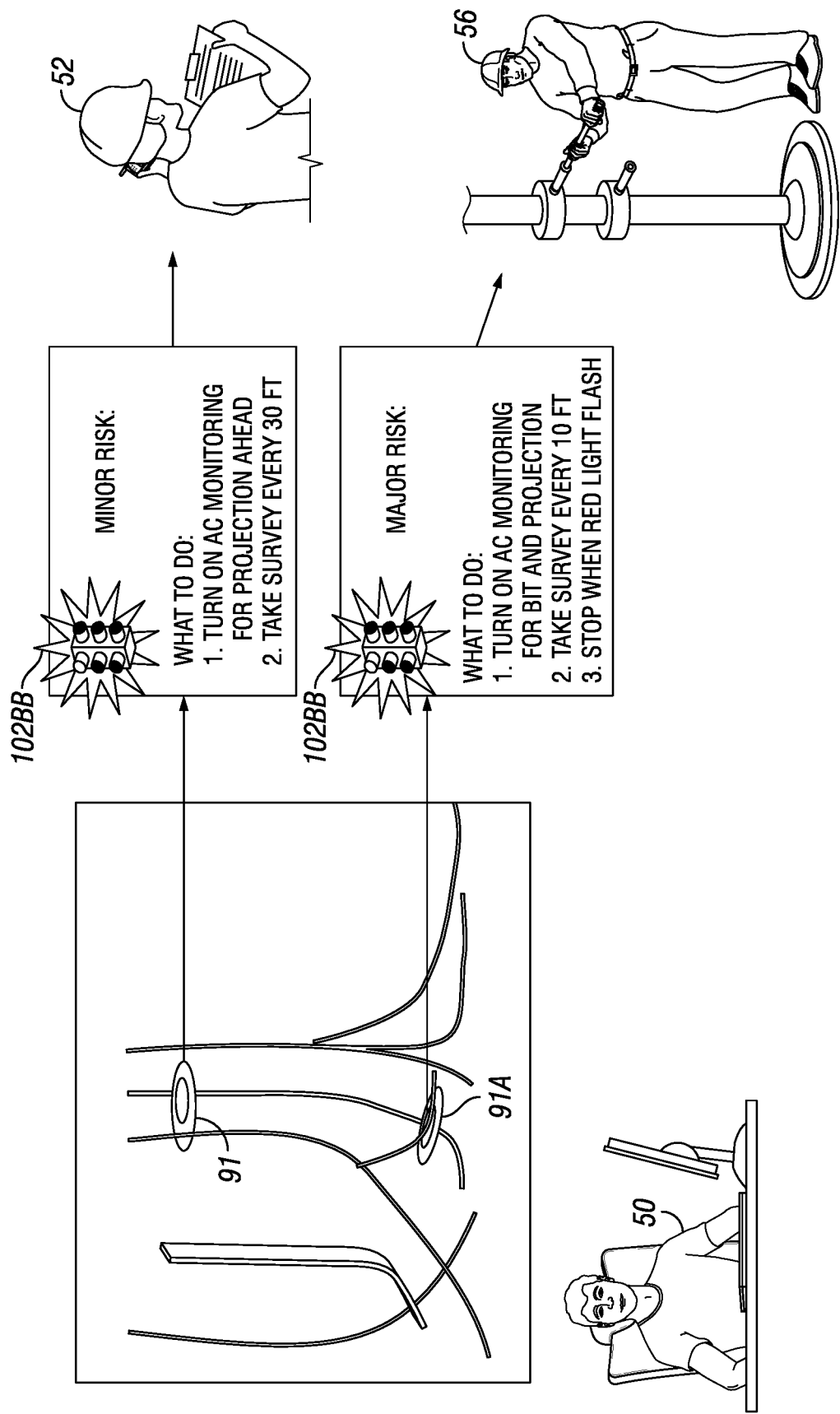
Figure 6:
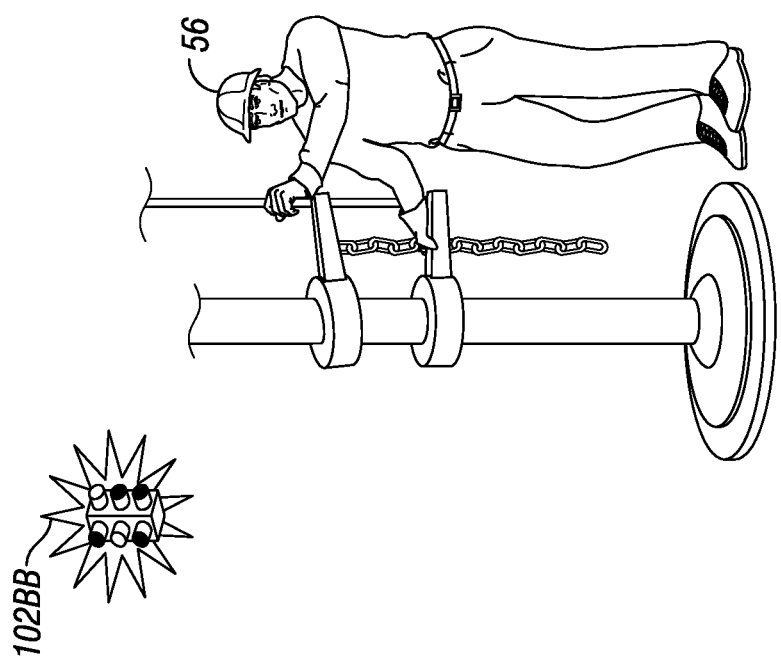

FIG. 5 shows two examples of communication of the calculated risk and advised actions being communicated to well site personnel. For a smaller risk, such as one at relatively shallow depth 91, an indicator or other signal may be communicated to the company man and/or toolpusher 52, for example, who may instruct the driller 56 to stop drilling the wellbore and directionally survey the wellbore to determine its subsurface geodetic position at every time a "joint" (single segment) is added to the drill string to lengthen the wellbore. Ordinary drilling may resume after the risk depth if safely passed during drilling, wherein a directional survey may be made at much longer intervals (e.g., every 90 to 270 feet). In a second situation, at 91A a much greater risk of collision may exist at a greater depth in the wellbore. In such case, an instruction may be communicated by the computer system to the relevant personnel at the well site, e.g., using display 102BB to make a directional survey at much smaller intervals, e.g., every 10 feet. A collision risk analysis may be performed in the computer system after the results of each such survey (e.g., well state as shown in FIG. 3). The computer system may then generate an indicator 102BB for use by the well site personnel to continue drilling or to stop drilling, depending on the calculated level of collision risk. As shown in FIG. 6, the computer system may continuously or intermittently communicate to the driller 56 a signal, e.g., by display 102BB whether to continue drilling or to stop, depending on the level or risk calculated in the computer system.

Figure 7:
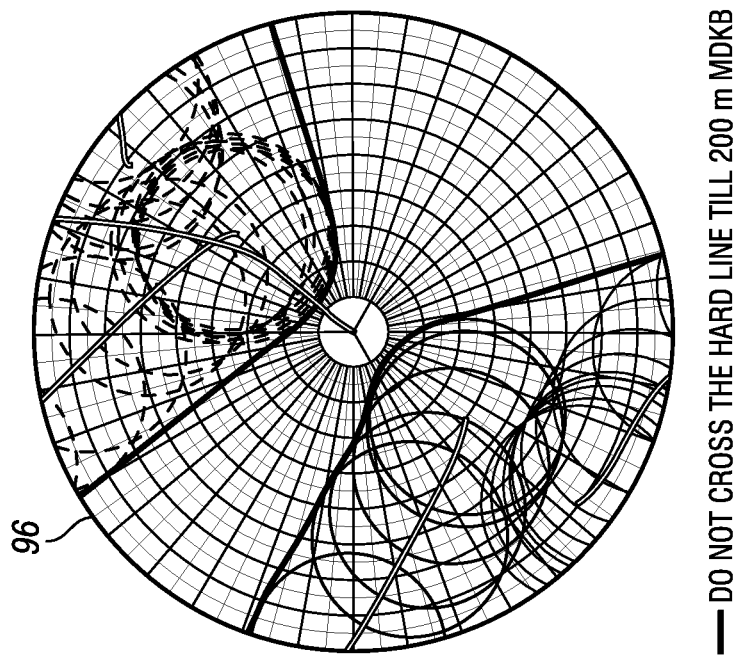
Figure 7:
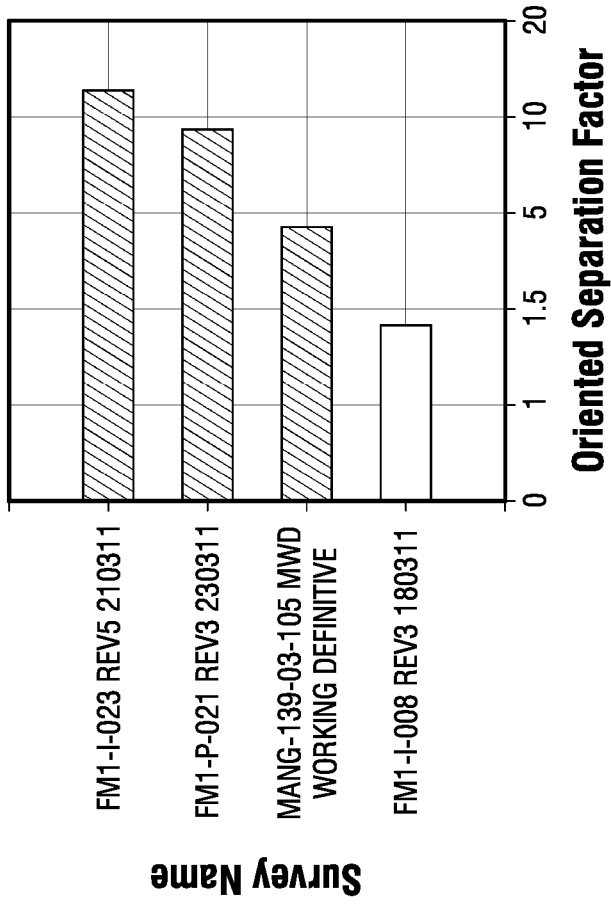
Figure 7:
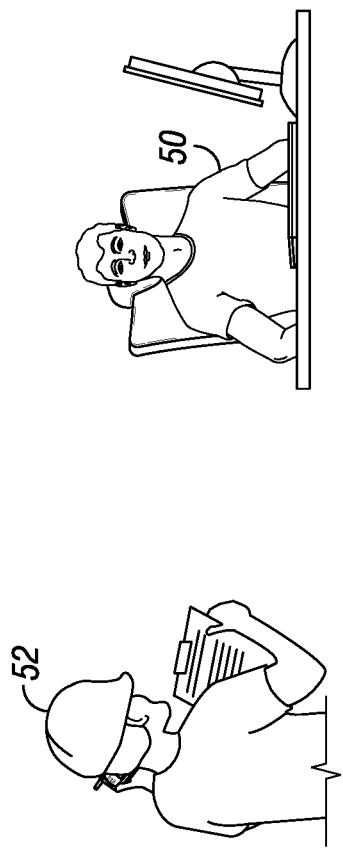

FIG. 7 shows an example of a display that may be communicated to the company man 52 and/or the driller (not shown in FIG. 7) as to how to adjust the well trajectory to reduce collision risk when drilling resumes. A polar coordinate plot 96 may be presented on a display (e.g., 101AA) used by the well construction engineer 50 to devise an adjustment to the wellbore trajectory so as to reduce collision risk. The change in trajectory may be communicated to the company man and/or toolpusher 52 who may instruct the driller accordingly.

Figure 8:
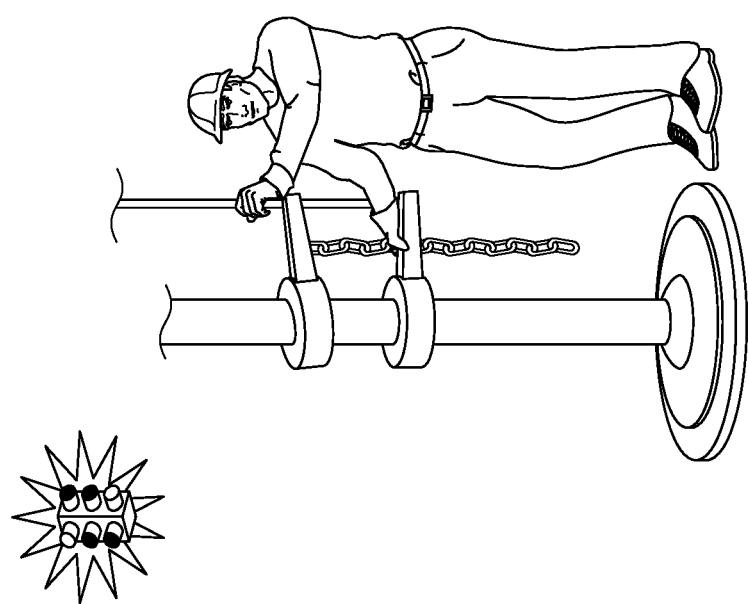

FIG. 8 is an example of a type of warning signal that may be communicated to the driller in the event it is determined that continued drilling will cause collision risk to exceed a predetermined threshold (which in some examples may be part of the policies entered into the computer system as shown in FIG. 3). The driller 56 may be instructed to stop drilling and contact the well construction engineer (50 in FIG. 7) for further instructions on how to mitigate the collision risk.

Figure 9:
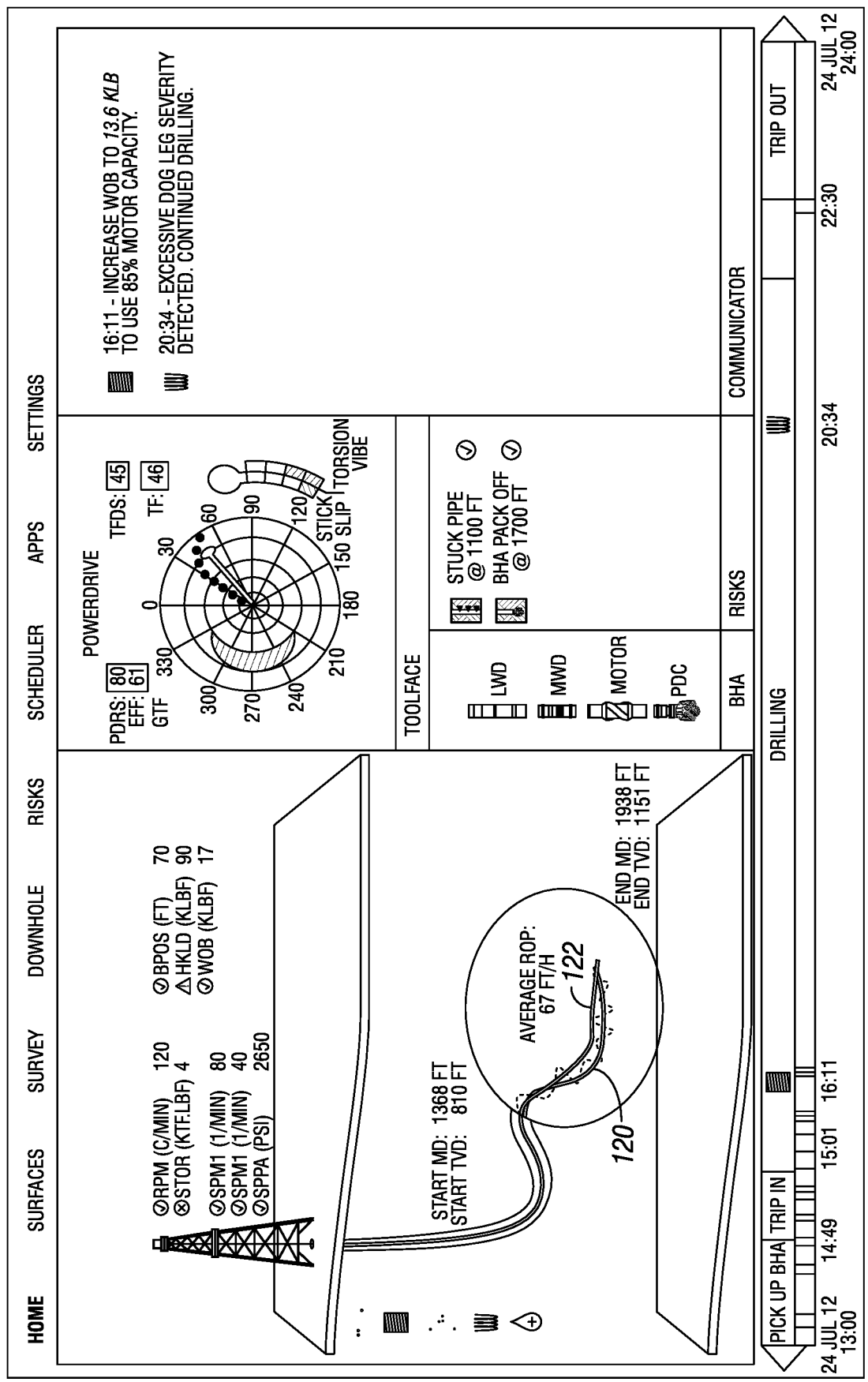
FIG. 9 shows an example display that may be used to evaluate well drilling performance and indicate possible corrective actions in the event drilling performance is not optimized.

FIG. 9 shows an example display that may be generated by the computer system and displayed on a suitable display device to any of the wellbore construction engineer and/or well site personnel, e.g., the company man and/or toolpusher to indicate actual drilling performance as contrasted with planned drilling performance. In the present example display a representation of the actual well trajectory 122 may be presented and have superimposed the planned well trajectory 120 and drilling operating parameters at any moment in time. The well construction engineer (50 in FIG. 7) may select a particular segment of the wellbore for evaluation, or the computer system may be preprogrammed to select a segment of the wellbore from its present bottom backward a selected distance for evaluation of drilling performance. In the present example, the measured axial force (weight) on the drill bit may be less than desirable to optimize the rate at which the wellbore is drilled. Calculated directional survey results (e.g., from the MWD system shown in FIG. 1) may indicate that the wellbore trajectory variation ("dog leg severity") exceeds those provided by the well construction engineer and/or by the policies entered into the computer system. In such cases, for example, the computer system (FIG. 2) may be programmed to send an instruction to the relevant well site personnel, e.g., the company man and/or the tool pusher (52 in FIG. 3) to initiate procedure to mitigate risk of having the drill pipe (FIG. 1) become stuck in the wellbore such as reaming the section of the wellbore determined to have excessive dog leg severity. The computer system may enable collaboration of the well construction decision process across the well construction personnel-specific roles and responsibilities. The computer system may direct a decision prompt or notice to a user with the authority (as determined by the wellbore operator) to make a specific decision and then communicate the response to the decision prompt to other system users, depending on the responsibility of the specific user. In this case, the driller (56 in FIG. 8) may not have the authority to execute the corrective action in the case of excessive dog leg severity. However, the system may notify the driller of the problem and may also notify the person authorized to make the decision to take corrective action, e.g., the company man 52 or the well construction engineer 50. When the authorized person makes the decision to take corrective action, it may be recorded by the computer system and communicated, e.g., to the driller 56 for implementation. The corrective action may be automatically calculated by the computer system in some examples.

Figure 10:
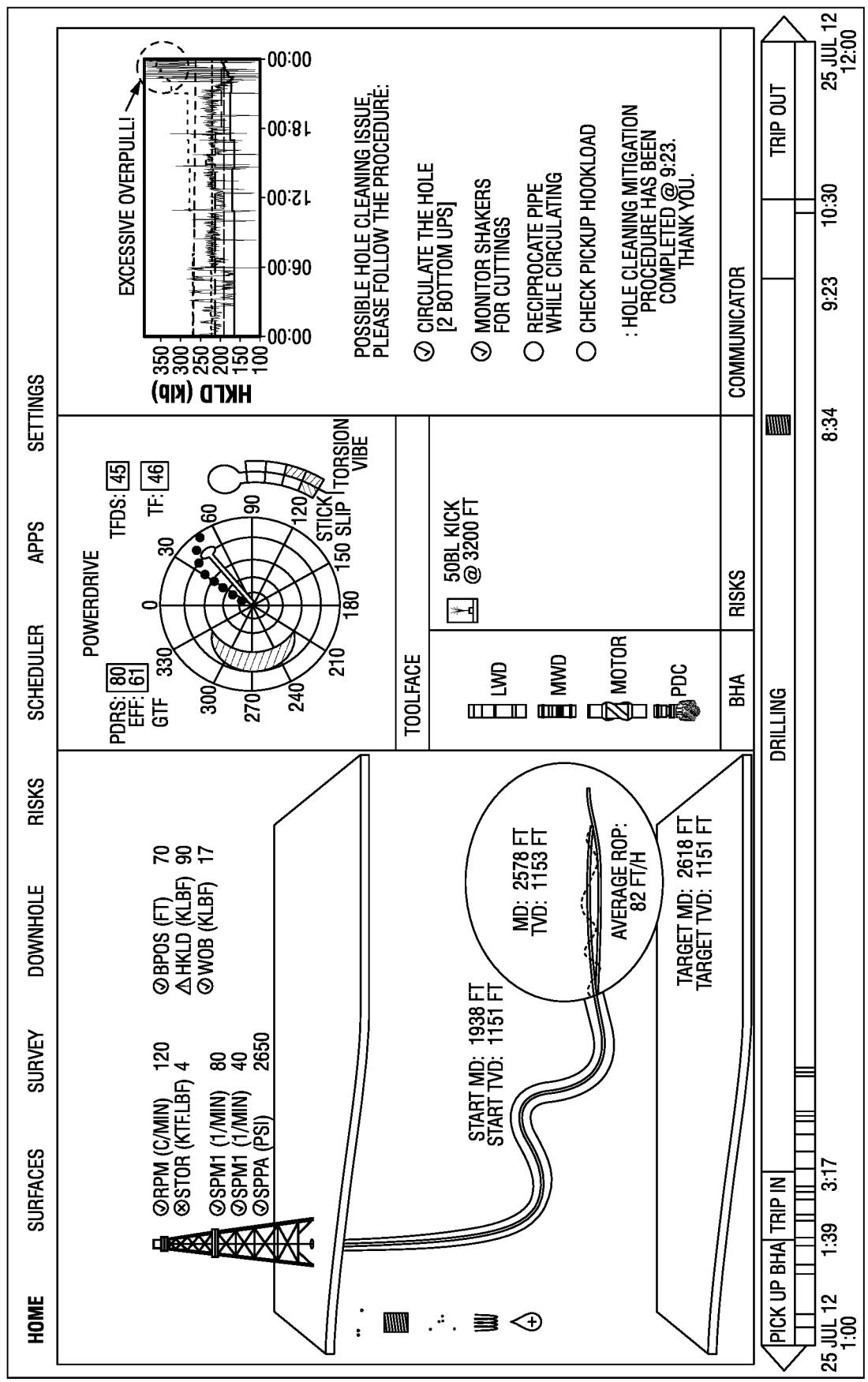
FIG. 10 shows another example display for evaluating well drilling performance.

FIG. 10 shows another example of the display shown in FIG. 9, with different adverse conditions encountered and different recommendations calculated and communicated to the relevant well site personnel. In the example of FIG. 10, when the drill string was lifted from the bottom of the wellbore, an excessive amount of force (beyond that calculated using models for the particular drill pipe, bottom hole assembly and wellbore trajectory) to lift the drill string was detected ("overpull"). The computer system may generate a set of recommendations to be communicated to the relevant well site personnel to, e.g., stop drilling ahead and merely operate the pump (30 in FIG. 1) to circulate drilling fluid, monitor the returned drilling fluid to determine if drill cuttings are present in certain quantities and move the drill pipe upward and downward (reciprocate) to alleviate the overpull condition.

Figure 11:
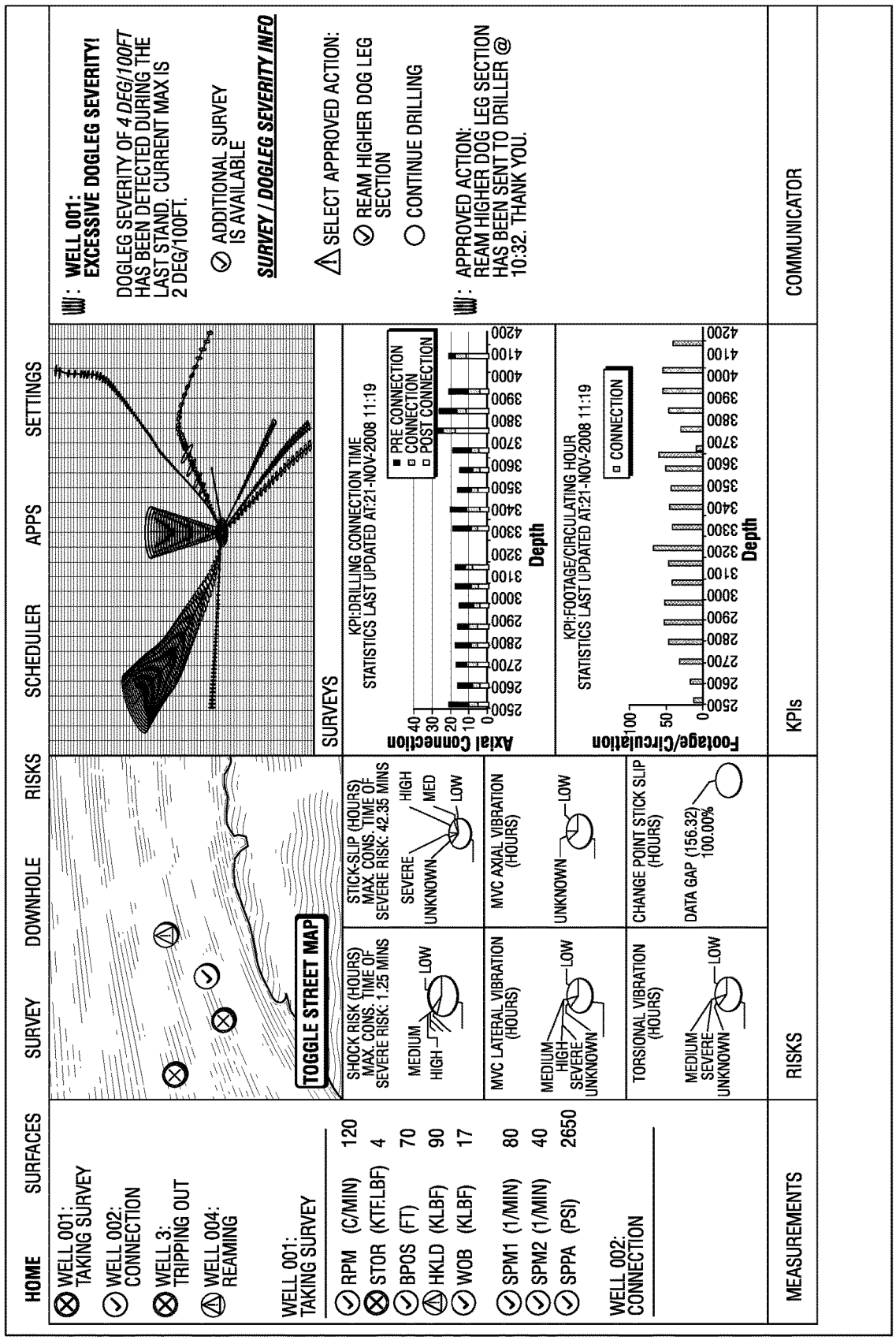
FIG. 11 shows an example display that may be provided to a well construction engineer for monitoring multiple wellbores.

FIG. 11 shows an example display that may be provided by the computer system to the well construction engineer for the purpose of making available views of the well state on each of a plurality of wells within the construction engineer's area of responsibility. The well construction engineer may select any one of a plurality of wells within his area to view in detail. Upon selection of a particular well, the computer system may display any of the well state parameters, active task map, drilling operating parameters, drilling risks and drilling performance parameters that the well construction engineer selects. Additionally, if the computer system detects an adverse well state on any one or more of the wells within the area, a warning signal may be displayed with respect to the affected well(s) so that the well construction engineer may evaluate the well state and communicate suggested corrective action to the affect well(s). The corrective actions may be calculated by the computer system and displayed for evaluation by the well construction engineer, or may be produced by the well construction engineer himself or in conjunction with corrective actions calculated by the computer system. The corrective actions may be communicated to the relevant well site personnel.

The computer system may also be programmed to record rig operating state parameters, for example, as described in U.S. Pat. No. 6,892,812 issued to Niedemayer et al. Time of each operating state may be recorded by the computer system (FIG. 3). The recorded time of each operating state may be correlated to the specific driller (FIG. 3) charged with operating the drilling unit. In this way, the performance of each driller may be monitored.

Throughout the well construction operation, the computer system (FIG. 2) may calculate and keep track of many different types of well performance indicators. Those indicators may be transmitted and stored in a central storage device in (e.g., as shown in FIG. 2) that can be accessed by other computers in the computer system shown in FIG. 2. Those calculated indicators may be organized and displayed in any selected format for well performance evaluation. For example, a drilling superintendent may select any one or several of a plurality of wells within his area of responsibility to compare the performance in the format of defined key performance indicators (KPIs in FIG. 11). When a KPI on a particular well is outside of a predetermined range, the computer system may display detailed breakdown information of the particular well's performance parameters and calculate corrective action on how to change one or more drilling operating parameters to cause the KPI to return to within its predetermined range. The computer system enables filtering of indicators by criteria for comparison based on relevance to provide business intelligence in decision making. For example, upon selection of a particular geographical region or time period, the computer system may display all the wells drilled or currently under construction in a selected geographical region and time period for selected personnel to compare the performance of similar wells that were drilled through similar formation, with same tools, or encountered the same type of problems during construction.

The computer system (FIG. 2) may record all wellbore state calculations and any of the decisions described above in a data storage device (e.g., as in FIG. 2) and can later replay for a user the drilling operations for a specified length of time (e.g., a previous shift or "tour") or between two tasks or events, e.g., a wellbore section or the entire construction operation from "spud" to release of the drilling rig from the particular location.

FIG. 3 shows that capabilities can be added to the system through a set of one or more "plug ins" for real-time data processing, surveillance, procedure generator, and execution. For example, rate of penetration optimization (ROPO), could be delivered with one or more trend detectors plugged into real-time data processing, a calculation plugged into execution that monitors the state and calculates the settings for optimum rate of penetration (ROP), and a graphical user interface (GUI) component for the driller that presents the recommendation and gives the driller the opportunity to accept or reject the recommended ROP calculation displayed therein. If the driller accepts the recommendations, then the execution engine (70 in FIG. 3) may send the corresponding commands to the equipment as shown in FIG. 3.

Figure 12:
FIG. 12 shows an example display for the purpose of decision support on equipment and logistics management at a well site.

FIG. 12 shows another example of the display shown in FIG. 11, with different adverse conditions encountered and different recommendations calculated and communicated to the relevant well site personnel for the purpose of decision support on equipment and logistics management at the well site. The computer system may keep track of all available equipment on the surface and downhole and may automatically communicate to well site personnel information and recommendations for regular maintenance needs. Based on the drilling states calculated as shown in FIG. 3 the computer system may propose a next date to be scheduled for maintenance to reduce the risk of equipment failure and consequent downtime. The computer system may calculate and display suggested repairs based on tool fatigue analysis capability that can be programmed into the computer system as shown in FIG. 3.

A well construction management and decision support system according to the present disclosure may enable increased drilling efficiency, more timely notification of drilling hazards, and more timely rectification of drilling hazards than systems known in the art prior to the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for use with a drilling rig, comprising:
a processor;
a memory coupled to the processor, the memory storing a plurality of instructions for execution by the processor, the plurality of instructions comprising instructions for:
determining an uncertainty of a position of a drill bit at the end of a drill string within a wellbore at a first depth during a drilling operation, wherein the drilling operation comprises adding pre-joined segments of drill pipe and drilling to elongate the wellbore using the pre-joined segments of drill pipe according to a recommended rate of penetration generated by a real-time rate of penetration optimization process;
determining an uncertainty of a position within an existing, separate wellbore at the first depth;
using the uncertainty of the position of the drill bit and the uncertainty of the position within the existing, separate wellbore, calculating a risk of collision between the drill bit and the existing, separate wellbore at the first depth; and
limiting the rate of penetration of the wellbore to a predetermined maximum value and increasing the frequency with which surveys are taken in response to determining that the collision risk is above a threshold, wherein increased frequency surveys comprise one or more measurements taken by a bottom hole assembly coupled to the drill bit within the wellbore at every time a single segment of drill pipe is added to the drill string, wherein the single segment is less than 90 feet in length, and wherein, after addition of the single segment, rotation of the drill bit recommences to lengthen the wellbore.

2. The system of claim 1, further comprising comparing the collision risk to one or more policies of a wellbore operator, wherein the one or more policies specify an acceptable level of collision risk.

3. The system of claim 1, further comprising generating one or more warning indicators in response to the collision risk rising above the threshold.

4. The system of claim 3, wherein the one or more warning indicators comprise an instruction to stop drilling.

5. The system of claim 1, wherein increasing the frequency with which surveys are taken while drilling comprises generating one or more instructions to one or more of a directional driller, a toolpusher, and a company man to take surveys more frequently.

6. The system of claim 1, wherein increasing the frequency with which surveys are taken while drilling comprises automatically inserting instructions for adding single segments of drill pipe and taking additional surveys in a well plan for creating the wellbore at every time one of the single segments of drill pipe is added to the drill string.

7. The system of claim 1, further comprising, in response to determining that the collision risk is at or below the threshold, decreasing the frequency with which surveys are taken and resuming the adding of pre-joined segments of drill pipe and the drilling to elongate the wellbore using the pre-joined segments of drill pipe according to a recommended rate of penetration generated by the real-time rate of penetration optimization process.

8. A system for use with a drilling rig, comprising:
a bottom hole assembly comprising a measuring while drilling (MWD) system that takes survey measurements comprising positional information of the bottom hole assembly in the wellbore during a drilling operation, wherein the bottom hole assembly is part of a drill string and coupled to a drill bit, and wherein the drilling operation comprises adding pre-joined segments of drill pipe and drilling to elongate the wellbore using the pre-joined segments of drill pipe according to a recommended rate of penetration generated by a real-time rate of penetration optimization process;
a processor;
a memory coupled to the processor, the memory storing a plurality of instructions for execution by the processor, the plurality of instructions comprising instructions for:
receiving survey measurements from the MWD system of the bottom hole assembly during the drilling operation at a first depth;
using the survey measurements, determining the position of the bottom hole assembly at the first depth at the time the survey measurements were taken;
determining an uncertainty of the position of a bottom hole assembly within the wellbore at a first depth during a drilling operation;
determining an uncertainty of a position within an existing, separate wellbore at the first depth;
using the uncertainty of the position of the bottom hole assembly and the uncertainty of the position within the existing, separate wellbore, calculating a risk of collision between the bottomhole assembly and the existing, separate wellbore at the first depth; and
limiting the rate of penetration of the wellbore to a predetermined maximum value and increasing the frequency with which surveys are taken in response to determining that the collision risk is above a threshold, wherein increased frequency surveys comprise one or more measurements taken by the bottom hole assembly within the wellbore at every time a single segment of drill pipe is added to the drill string, wherein the single segment is less than 90 feet in length, and wherein, after addition of the single segment, rotation of the drill bit recommences to lengthen the wellbore.

9. The system of claim 8, further comprising comparing the collision risk to one or more policies of a wellbore operator, wherein the one or more policies specify an acceptable level of collision risk.

10. The system of claim 8, further comprising generating one or more warning indicators in response to the collision risk rising above the threshold.

11. The system of claim 10, wherein the one or more warning indicators comprise an instruction to stop drilling.

12. The system of claim 8, wherein increasing the frequency with which surveys are taken while drilling comprises generating one or more instructions to one or more of a directional driller, a toolpusher, and a company man to take surveys more frequently.

13. The system of claim 8, wherein increasing the frequency with which surveys are taken while drilling comprises automatically inserting instructions for adding single segments of drill pipe and taking additional surveys in a well plan for creating the wellbore at every time one of the single segments of drill pipe is added to the drill string.

14. The system of claim 8, further comprising, in response to determining that the collision risk is at or below the threshold, decreasing the frequency with which surveys are taken and resuming the adding of pre-joined segments of drill pipe and the drilling to elongate the wellbore using the pre-joined segments of drill pipe according to a recommended rate of penetration generated by the real-time rate of penetration optimization process.

15. A method comprising:
receiving survey measurements from a bottom hole assembly comprising a measuring while drilling (MWD) system at a first depth during a drilling operation to create a wellbore, wherein the bottom hole assembly is part of a drill string and coupled to a drill bit, and wherein the drilling operation comprises adding pre-joined segments of drill pipe and drilling to elongate the wellbore using the pre-joined segments of drill pipe according to a recommended rate of penetration generated by a real-time rate of penetration optimization process;
using the survey measurements, determining the position of the wellbore at the first depth at the time the survey measurements were taken;
determining an uncertainty of the position of the wellbore at the first depth during the drilling operation;
determining an uncertainty of a position within an existing, separate wellbore at the first depth;
using the uncertainty of the position of the wellbore and the uncertainty of the position within the existing, separate wellbore, calculating a risk of collision between the wellbore and the existing, separate wellbore at the first depth; and
limiting the rate of penetration of the wellbore to a predetermined maximum value and increasing the frequency with which surveys are taken in response to determining that the collision risk is above a threshold, wherein increased frequency surveys comprise one or more measurements taken by the bottom hole assembly within the wellbore at every time a single segment of drill pipe is added to the drill string, wherein the single segment is less than 90 feet in length, and wherein, after addition of the single segment, rotation of the drill bit recommences to lengthen the wellbore.

16. The method of claim 15, further comprising comparing the collision risk to one or more policies of a wellbore operator, wherein the one or more policies specify an acceptable level of collision risk.

17. The method of claim 15, further comprising generating one or more warning indicators in response to the collision risk rising above the threshold.

18. The method of claim 15, wherein the one or more warning indicators comprise an instruction to stop drilling.

19. The method of claim 18, wherein increasing the frequency with which surveys are taken while drilling comprises generating one or more instructions to one or more of a directional driller, a toolpusher, and a company man to take surveys more frequently.

20. The method of claim 15, wherein increasing the frequency with which surveys are taken while drilling comprises automatically inserting instructions for adding single segments of drill pipe and taking additional surveys in a well plan for creating the wellbore at every time one of the single segments of drill pipe is added to the drill string.

21. The method of claim 15, further comprising, in response to determining that the collision risk is at or below the threshold, decreasing the frequency with which surveys are taken and resuming the adding of pre-joined segments of drill pipe and the drilling to elongate the wellbore using the pre-joined segments of drill pipe according to a recommended rate of penetration generated by the real-time rate of penetration optimization process.

\* \* \* \* \*